US007953035B2

(12) United States Patent
Gopal (10) Patent No.: US 7,953,035 B2
(45) Date of Patent: May 31, 2011

(54) QOS ENHANCEMENTS ON THE ACCESS CHANNEL

(75) Inventor: Thawatt Gopal, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 978 days.

(21) Appl. No.: 11/772,637

(22) Filed: Jul. 2, 2007

(65) Prior Publication Data

US 2008/0037463 A1 Feb. 14, 2008

Related U.S. Application Data (60) Provisional application No. 60/821,740, filed on Aug. 8, 2006.

(51) Int. Cl.
| | |
|---|---|
| H04W 4/00 | (2009.01) |
| H04B 7/212 | (2006.01) |
| H04L 12/413 | (2006.01) |
| H04L 12/43 | (2006.01) |
| H04J 3/02 | (2006.01) |
| H04W 40/00 | (2009.01) |
| H04W 72/00 | (2009.01) |

(52) U.S. Cl. ........ 370/328; 370/445; 370/447; 370/461; 455/434; 455/445; 455/452.2

(58) Field of Classification Search .......... 370/328, 370/310, 444, 445, 447, 461, 462; 455/445, 455/452.2, 434
See application file for complete search history.

(56) References Cited

U.S. PATENT DOCUMENTS

| | | | | |
|---|---|---|---|---|
| 6,400,695 | B1 * | 6/2002 | Chuah et al. | ........... 370/310 |
| 2002/0118661 | A1 | 8/2002 | Voce | |
| 2004/0001429 | A1 | 1/2004 | Ma et al. | |
| 2004/0013089 | A1 | 1/2004 | Taneja et al. | |
| 2004/0157602 | A1 | 8/2004 | Khawand | |
| 2004/0160977 | A1 | 8/2004 | Dick et al. | |
| 2005/0047335 | A1 | 3/2005 | Cheng et al. | |
| 2006/0084432 | A1 * | 4/2006 | Balasubramanian et al. | 455/434 |
| 2006/0268768 | A1 * | 11/2006 | Harris et al. | ........... 370/328 |
| 2007/0002750 | A1 | 1/2007 | Sang et al. | |

(Continued)

OTHER PUBLICATIONS

"3rd Generation Partnership Project 2 "3GPP2"cdma2000 High Rate Packet Data Air Interface Specification," 3GPP2 C.S0024-A, Sep. 2006, see, for example; pp. 10-35 to 10-78, 12-8, 12-9, 12-19 to 12-21, 13-7, 13-8, 13-23, 13-24, Version 3.0.

(Continued)

*Primary Examiner* — George Eng
*Assistant Examiner* — Wesley L Kim
(74) *Attorney, Agent, or Firm* — Slater & Matsil, L.L.P.

(57) ABSTRACT

A method comprising modifying a plurality of access channel (AC) probe parameters using a plurality of intra-user service classes, and accessing an AC using the modified AC probe parameters. The disclosure includes a communications component comprising a processor configured to implement a method comprising recognizing a registration request from an access terminal (AT), wherein the registration request causes a quality of service (QoS) profile comprising an inter-user QoS class for the AT to be requested, retrieving at least one intra-user access service parameter based on the inter-user class, and sending the intra-user access service parameter to the AT. The disclosure also includes a mobile access network comprising an access node (AN) in communication with a plurality of ATs, wherein the AN differentiates service for the ATs based on inter-user service classes and intra-user service class types.

22 Claims, 5 Drawing Sheets

U.S. PATENT DOCUMENTS

2007/0110071 A1 5/2007 Rezaiifar et al.
2008/0293413 A1* 11/2008 Sharif-Ahmadi et al. . 455/435.1
2009/0129319 A1* 5/2009 Buddhikot et al. ........... 370/328

OTHER PUBLICATIONS

"TIA/EIA Interim Standard, CDMA 2000 High Rate Packet Data Air Interface Specification," TIA/EIA/IS-856-1, Jan. 2002, see, for example; pp. 8-22 to 8-39, 9-23 to 9-34, Addendum 1.

"3$^{rd}$ Generation Partnership Project 2 "3GPP2"cdma2000 Wireless IP Network Standard: Accounting Services and 3GPP2 RADIUS VSAs," 3GPP2 X.S0011-005-D, Feb. 2006, 75 pages, Version 1.0.

"3$^{rd}$ Generation Partnership Project 2 "3GPP2" cdma2000 Wireless IP Network Standard: Quality of Service and Header Reduction," 3GPP2 X.S0011-004-D, Feb. 2006, 72 pages. Version 1.0.

Zou, Jialin, et al.; "Support the Emergency and Priority Services for HRPD—Part II";TSG-C; Lucent Technologies; Date Unknown; 6 pgs.

Nortel Networks; "Priority Service"; 3GPP2 TSG-G; Date Unknown; 10 pgs.

Attar, Rashid, et al.; "Application Based Access Control for HRPD for Wireless Emergency and Priority Services Work Item"; 3GPP2; C21-20061030-011; Oct. 30, 2006; 3 pgs.

3rd Generation Partnership Project 2 "3GPP2"; "CDMA2000 High Rate Packet Data Air Interface Specification"; 3GPP2 C.S0024-A; Version 2.0; Jul. 2005; 1227 pgs.

Etemad, Kamran,; "Enhanced Random Access and Reservation Scheme in CDMA2000"; Wireless Facilities Inc.; IEEE Personal Communications; Apr. 2001; pp. 30-36.

* cited by examiner

QOS ENHANCEMENTS ON THE ACCESS CHANNEL

CROSS-REFERENCE TO RELATED APPLICATIONS

This application claims priority to U.S. Provisional Application Ser. No. 60/821,740, filed Aug. 8, 2006 by Thawatt Gopal and entitled "QoS Enhancements on the Access Channel" which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless access network, such as an evolution-data optimized (EDVO) network, comprises a plurality of access nodes (AN) and a plurality of access terminals (AT) in communication with the ANs. The wireless access networks allow the ATs to communicate with each other and to a core network. A wireless AT may be a cell phone, a wireless PDA, or other device equipped with a wireless access device, whereas a wireless AN may be one or more base transceiver stations coupled to a base station controller. A wireless AT communicates with a wireless AN through an air interface, whereas the AN generally communicates with the core network via a wired connection.

In new generations of wireless access networks, Internet Protocol (IP) is being used in place of conventional time division multiplexing (TDM) as the access network technology and the wireless core network technology. Examples of wireless technologies that use IP as the access network technology include universal mobile telecommunications system (UMTS), code division multiple access 2000 (CDMA2000), and some of the fourth generation (4G) wireless technologies. In IP access network, multiple access terminals may share an access channel to communicate with an access node to gain the permission to transmit. There may be contention for the access channel (AC) by multiple ATs.

SUMMARY

In a first embodiment, the disclosure includes a method comprising modifying a plurality of AC probe parameters using a plurality of intra-user service classes, and accessing an AC using the modified AC probe parameters.

In a second embodiment, the disclosure includes a communications component comprising a processor configured to implement a method comprising recognizing a registration request from an AT, wherein the registration request causes a QoS profile comprising an inter-user QoS class for the AT to be requested, retrieving at least one intra-user access service parameter based on the inter-user class, and sending the intra-user access service parameter to the AT.

In a third embodiment, the disclosure includes a mobile access network comprising an AN in communication with a plurality of ATs, wherein the AN differentiates service for the ATs based on inter-user service classes and intra-user service class types.

In a fourth embodiment, the disclosure includes a mobile access network, comprising a first network device configured with a first intra-user QoS module configured to vary an access latency for an AC using a plurality of intra-user QoS enhanced AC probing parameters in a plurality of AC probe procedures, thereby gaining access to the AC.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For IP-based wireless access networks such as CDMA2000 and 4G networks, the procedures for resolving the contention for the AC among multiple ATs does not address intra-user QoS. For example, the AC contention resolution procedures do not distinguish between a push-to-talk (PTT) call and a web browsing session from the same user. As such, the latencies or wait times for the AC for the PTT call and the web browser session are statistically the same. This may not be desirable, especially in case of heavy traffic congestion when the latency for the AC may be long. Therefore, the present disclosure provides a set of intra-user service classes to distinguish between different types of applications for the same user and a set of access channel probe scaling factors for a set of access channel probe procedures. The intra-user service classes and the AC probe scaling factors are applied to a set of default AC probing parameters to create a set of intra-user QoS enhanced AC probing parameters. Unlike CDMA2000 EDVO Rev. A, which uses the same AC probing parameters for all applications, the intra-user QoS enhanced AC probing parameters described herein are used in the AC probe procedures to vary the AC latencies, according to the intra-user service class to which the link flow belongs.

Figure 1:
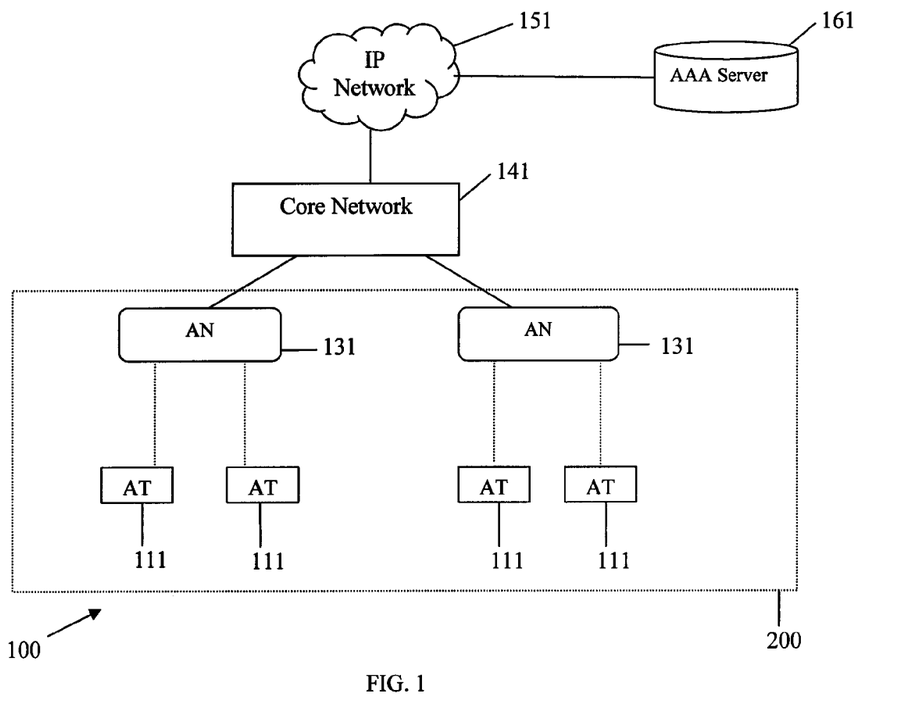
FIG. 1 illustrates an embodiment of a wireless network.

FIG. 1 illustrates an embodiment of a wireless network 100. The wireless network comprise an authorization, authentication and accounting (AAA) server 161, an IP network 151, a core network 141, and a radio access network (RAN) 200. The RAN 200 in turn comprises a set of access terminals (ATs) 111, and a set of access nodes (ANs) 131. Each of these components is described in further detail below.

The AT 111 may be a wireless access device that may initiate wireless communications with an AN 131. The AT 111 may be a cell phone, a PDA, or a computer with a wireless access card. An AT 111 may initiate one of a variety of link flows, such as a voice over internet protocol (VoIP) call, a PTT call, a multi-media call, a conference call, or a web browser session. The AT 111 may be coupled to the AN 131 via an air interface. There are different wireless technologies for transferring data over open air between the AT 111 and the AN 131, including TDMA, CDMA, and UMTS, among others. A plurality of ATs 111 may be coupled to one AN.

The AN 131 may be a wireless access network node that facilitates communications between a number of ATs 111 and a core network 141. The AN 131 may be a logical aggregation of one or more physical entities. For example, in some of second generation (2G) or some of the third generation (3G) wireless network configurations, the AN 131 may comprise a number of base transceiver stations (BTSs) and a base station controller (BSC). A BTS may comprise an antenna tower that sends and receives radio signals to/from the ATs 111 within its transmission range. Multiple BTSs may be coupled to a BSC via physical wires such as copper or fiber wires. In addition to the ATs 111, multiple BSCs and BTSs may form the RAN 200, which is coupled to a core network 141. The AN 131 may be configured to route a link flow or a stream of packets to a node in the core network 141, such as an IP router would route a packet stream to a destination note.

The core network 141 may be a network that allows the RAN 200 to communicate with the IP network 151. The core network 141 may be responsible for routing a call from an originating RAN 200 to a destination RAN 200 via zero or more intermediate networks, such as the IP network 151. Specifically, the IP network 151 may allow one wireless core network 141 to communicate with another wireless core network 141. The core network 141 and/or the IP network 151 may be packet switched networks, time division multiplexed networks, the traditional public switched telephone network (PSTN), an asynchronous transfer mode (ATM) network, or any combination thereof.

The AAA server 161 may be responsible for the authorization, authentication, and accounting functions. The AAA server 161 may comprise a subscriber profile database, which may be used for performing the security and accounting related tasks. The AAA server 161 may authenticate the user associated with an AT 111 by confirming that the identity or credential the user presented is authentic. The AAA server 161 may also authorize a user to use certain network services and resources. This may be done by granting a user's service request according to the user's subscriber profile that may specify the type of services and resources grantable to the user and the applicable restrictions. The AAA server 161 may also be responsible for keeping track of the usage of the services and resources by the user for accounting, auditing, and other purposes.

Figure 2:
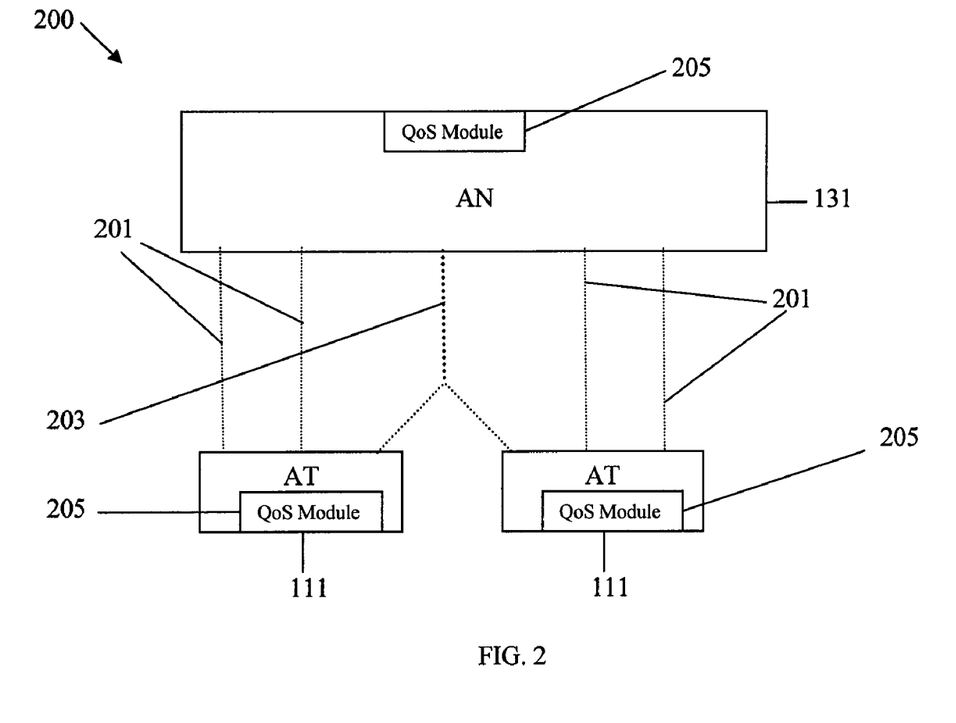
FIG. 2 illustrates an embodiment of the communication channels in a wireless network.

FIG. 2 illustrates an embodiment of the communication channels 200 in a wireless access network. As with FIG. 1, the wireless access network comprises the ATs 111 and the AN 131. The communication channels 200 include a plurality of link flows 201 and an AC 203. A QoS module 205 may be located in the AN 131 and/or the ATs 111. Each of these items is described in further detail below.

The AC 203 is a logical channel connecting the AN 131 and multiple ATs 111 over an air interface, and is shared among the multiple ATs 111. The AT 111 may use the AC 203 to set up, tear down, modify, and service the link flows 201. For example, the AT 111 may need to gain access to the AC 203 to turn on a link flow that is in a deactivated state. More than one attempt to gain access to the AC 203 by multiple ATs 111 at the same time would create a contention for the AC. The contention for the AC may be resolved using a set of AC contention resolution procedures described below.

In one embodiment, the issue of contention for the AC 203 by the multiple ATs 111 is addressed through a probe and a set of probe procedures. As explained below, the AC probing parameters are configured to allow inter-user and intra-user QoS. In contrast, the existing mechanisms, e.g. those defined in the CDMA2000 EVDO Rev. A standard, do not allow parameters to be assigned for intra-user QoS. The AN and the AT can negotiate the intra-QoS AC probe parameters during session negotiation/configuration or when the session is active. The AN then sends the AC probing mechanism parameters to the AT using a combination of broadcast and unicast EVDO air-interface signaling messages. Once the probe parameters are received, each AT 111 sends a probe after a predefined interval to attempt to gain access to the AC 203. When a collision or a failure occurs, the AT 111 may try to send another probe after a timeout. A set of AC probing parameters specify how often and how fast an AT 111 should send a probe, and thus may also determine how often and fast the AT 111 eventually gains access to the AC 203. For example, some of the AC probing parameters may require that the AT 111 increase transmission power and inter-probe intervals after each probe failure and within a specified period of time. A sequence of AC probes form a channel probe cycle. The AT 111 may start a new probe cycle if the previous cycle fails. Each AT 111 will continue until either it succeeds in gaining access to the AC 203 or has exhausted a predefined number of probe cycles.

The number of AC probe procedures that an AT 111 follows may vary, depending on a specific protocol choice. 3GPP2 specification "CDMA2000 high-rate packet data (HRPD) air-interface standards," which is incorporated by reference herein, provides an example AC probe procedures. Specifically, 3GPP2 C.S0024-A provides exemplary AC probe procedures and related protocols may include a persistence test, a probe backoff, and a probe sequence backoff.

The persistence test is a test by the AT 111 to avoid colliding with another AT 111 that is attempting to send a probe at the same time. The persistence test may be required before sending the first probe of a probe cycle or probe sequence. One AC probing parameter associated with the persistence test is a parameter, p, that determines how long the AT 111 needs to wait before attempting the next probe. The probe backoff procedure may allow the AT 111 to wait for an inter-probe timeout period before attempting the next probe in a probe sequence. In existing protocols, the inter-probe timeout period is the same for all types of link flows. The probe sequence backoff is another procedure that may require that the AT 111 wait for an inter-sequence timeout period before starting the next sequence of probes. The inter-sequence timeout period may be based on a uniformly distributed number and the inter-probe timeout period.

An issue associated with the existing AC probe procedures is that no distinction is made between different types of link flows. For example, a probe for a PTT call and a probe for a web browser session are treated the same for the same user. Therefore, it takes the same amount of time for an AT 111 to gain access to the AC 203 for the PTT call as it does for the web browser session. This issue is referred to as a lack of intra-user QoS, because different applications for the same user receive the same treatment in the AC probe procedures for gaining access to the AC.

After the AC 203 is accessed, one or more link flows 201 may be established. Each of the link flows 201 is a logical connection that connects one of the ATs 111 to the AN 131 over an air interface. The link flow may be destined for a remote RAN and may be used to carry a voice call, a data call, a multi-media call, a conference call, or some other application. The link flow 201 is set up when the AT 111 initiates a call, in negotiation with the AN 131, and it may have a state to indicate whether it is currently in use. The link flow is torn down when the session or the call ends. Each of the ATs 111 may have multiple link flows 201 set up over an air interface between the AT 111 and the AN 131, which may be destined for multiple destinations.

According to one embodiment of the present disclosure, the QoS module 205 comprises intra-user QoS enhancements to the existing AC probe procedures. The intra-user QoS enhancements may comprise a data infrastructure part and a process part. The data infrastructure part of the intra-user QoS enhancements may comprise a set of inter-user service classes, a set of intra-user service classes, and a set of AC probe scaling factors along with a set of intra-user QoS enhanced AC probing parameters.

A plurality of inter-user service classes may categorize users into different classes and provide differential treatments to the users of different classes, according to some prior-agreed service level agreement (SLA). The inter-user service classes may be used for an inter-user QoS where the same application belonging to different users of different inter-user service classes may receive different treatments. For example, the same best-effort data service may have different QoS treatments for two users, one belonging to a higher-priority inter-user service class and one belonging to a lower priority inter-user service class. In one embodiment, three inter-user service classes are defined: gold, silver, and bronze. In another embodiment, four inter-user service classes are defined: platinum, gold, silver, and bronze. However, the disclosure should not be limited to these examples, as a person of ordinary skill in the art will appreciate that any number of inter-user service classes may be defined.

A plurality of intra-user service classes may be used to achieve intra-user QoS enhancements for gaining access to the AC 203. For the intra-user QoS enhancements, different applications belonging to the same user may receive differential treatments according to the intra-user service class to which each application belongs. Specifically, the different link flows are categorized into different intra-user service classes for differential treatments in gaining access to the AC 203. These intra-user differential treatments may determine how fast the AT 111 may gain access to the AC 203 for a link flow of a particular intra-user service class. A link flow of a higher-priority intra-user service class may gain access to the AC 203 faster than a link flow of a lower-priority intra-user service class. In one embodiment, the intra-user service classes comprise a best effort (BE), an assured forwarding (AF), and an expedited forwarding (EF), in an ascending priority. The EF intra-user service class is favored over the AF, and the AF is favored over the BE. For example, real-time voice calls, such as a PTT call or a voice over internet protocol (VoIP) call, may be designated as belonging to the EF intra-user service class, constant-bandwidth, e.g. 32 kilobits per second (kbps), streaming audio and/or video link flows may belong to the AF intra-user service class, and web browser sessions, email, and text messages may belong to the BE intra-user service class. The link flows of the AF intra-user service class receive the more favorable treatment in gaining access to the AC 203 over link flows of the AF or the BE intra-user service classes. In addition to the above three intra-user service classes, other intra-user service classes may also be defined to deal with the case where the differential treatments are not required or not applicable, but are needed for the simplicity of protocol operations. For example, some of the 3GPP2 C.S0024, e.g. EVDO, signaling messages need to be sent over the AC even though these messages are not IP-based application data. These messages are also subject to probing on the AC since the AC is contention based in CDMA2000 EVDO. In one embodiment, two additional intra-user service classes, other signaling (OS) and other experimental (OE), are created for the signaling messages and possible future extensions. However, the disclosure should not be limited to these examples, as a person of ordinary skill in the art will appreciate that any number of intra-user service classes may be defined.

The intra-user service classes may be used with the inter-user service classes to combine the intra-user QoS with the inter-user QoS. For example, in one embodiment, an operator may have three inter-user service classes: gold, silver, and bronze. For each inter-user service class, an independent set of intra-user service classes may be defined. For example, a set of intra-user service classes including a BE intra-user service class, an AF intra-user service class, and an EF intra-user service class, may be defined for the gold inter-user service class. A different set of values for the intra-user service classes including a BE intra-user service class, an AF intra-user service class, and an EF intra-user service class, may be defined for the silver inter-user service class. A separate set of values for the set of the intra-user service classes may be defined for the bronze inter-user service class.

A third part of the data infrastructure for the intra-user QoS enhancements is a set of AC probe scaling factors and a resulting set of intra-user QoS enhanced AC probing parameters. The exemplary AC probe procedures, as described earlier, may include persistence test, probe backoff, probe sequence backoff, and combination ruling, among others. For each of the procedures, there is at least one AC probing parameter that affects the latency or wait time related to the probe transmission. In the present disclosure, a set of AC probe scaling factors is created, one for each probe procedure. Applying each of the intra-user service classes to each of the probe scaling factors yields a set of probe scaling factor parameters for each intra-user service class and the corresponding probe procedure. Then subsequent modification of the set of default AC probing parameters with the set of probe scaling factor parameters yields a set of intra-user QoS enhanced AC probing parameters. The intra-user QoS enhanced AC probing parameters may be used in the AC probe procedures to differentiate the latency in gaining access to the AC 203 according to the intra-user service class of an application.

In one embodiment, the AC probe scaling factors comprise a persistence test scaling factor, a probe backoff scaling factor, and a probe sequence backoff scaling factor. Each of the scaling factors has a set of corresponding scaling factor parameters that corresponds to the intra-user service classes, as described below.

The persistence test scaling factor parameters include Persistence BE, Persistence AF, Persistence EF, Persistence OE, and Persistence OS. The persistence test has a default parameter, p, that defines the wait time before attempting another probe transmission. Instead of using the default persistence test parameter p, p is modified by a persistence test scaling factor parameter appropriate for a link flow for which the AC 203 is being requested. For example, p is defined as p equal to p*aScalingFactorP, where aScalingFactorP is a scaling factor parameter appropriate for the application. The scaling factor parameter persistence BE may be used for a link flow that is categorized as of the BE service class type for a web browsing application. In comparison, for a link flow for a PTT call, the default parameter p may be multiplied by the persistence test scaling factor parameter persistence EF to favor the PTT call over the web browsing application in starting the next probe.

The probe backoff scaling factor parameters include Probe backoff BE, Probe backoff AF, Probe backoff EF, Probe backoff OE, and Probe backoff OS. Each probe backoff procedure has a probe backoff parameter, y, to specify a default backoff timeout period before the AT 111 may attempt the next probe in a probe sequence. Without the intra-user QoS enhancements, y is equal to a random number between zero and predMax, where predMax is a predefined upper limit. To achieve intra-user QoS enhancements, the default backoff period y is modified by a probe backoff scaling factor parameter as follows: y is equal to a random number between zero and (predMax*aScalingFactorP), where aScalingFactorP is a scaling factor parameter that is appropriate for the link flow for which the AC 203 is being requested. The result is to favor one application of a higher-priority intra-user service class, such as an application of the EF intra-user service class, over an application of a lower-priority intra-user service class such as the BE intra-user service class. Such may be the case regardless of the inter-user class. For example, a bronze level Probe backoff EF may be favored over a gold level Probe backoff BE, where appropriate.

The probe sequence backoff scaling factor parameters include Probe sequence backoff BE, Probe sequence backoff AF, Probe sequence backoff EF, Probe sequence backoff OE, and Probe sequence backoff OS. Each probe sequence backoff procedure has a probe sequence backoff parameter, k, to specify a default backoff timeout period before the AT 111 starts the next probe sequence. Without the intra-user QoS enhancements, k is equal to a random number between zero and predMax, where predMax is a predefined upper limit. To achieve the intra-user QoS enhancements, the default sequence backoff period k is modified by a sequence probe backoff scaling factor parameter as follows: k is equal to a random number between zero and (predMax*aScalingFactorP), where aScalingFactorP is a scaling factor parameter that is appropriate for the link flow for which the AC 203 is being requested. The result is to favor one application of a higher-priority intra-user service class, such as an application of the EF intra-user service class, over an application of a lower-priority intra-user service class such as the BE intra-user service class. For example, a bronze level Probe sequence backoff EF may be favored over a gold level Probe sequence backoff BE, where appropriate.

The combination ruling factor is a set of rules that may be used when the AT needs to send a probe on the AC requesting activation of multiple link flows with different QoS classes. For example, when the AT wants to request activation of link flows corresponding to the BE and EF intra-user service classes simultaneously in the same AC probe, the combination ruling factor should be used to resolve any ambiguity between the request for the two flows. The combination ruling factor is a new functionality that does not exist in the AC protocol in other wireless standards, such as CDMA2000 EVDO. The combination ruling factors includes a list of attributes listed in order of precedence. These attributes include CR-EF, CR-AF, CR-BE, CR-OS, and CR-OE. The order in which the attributes appear in the list determines which parameter class to choose, and the order of the list is configurable by the network operator. For example, if the AT 111 intends to request activation of two link flows, one belonging to the BE intra-user service class and one belonging to the EF intra-user service class, then the AT 111 uses the combination ruling factor attributes to determine which AC probing parameters to use. Referring to the above list, CR-EF occurs before CR-BE, and thus the AT 111 would choose the parameters corresponding to the EF intra-user service class over the BE intra-user service class.

Figure 3:
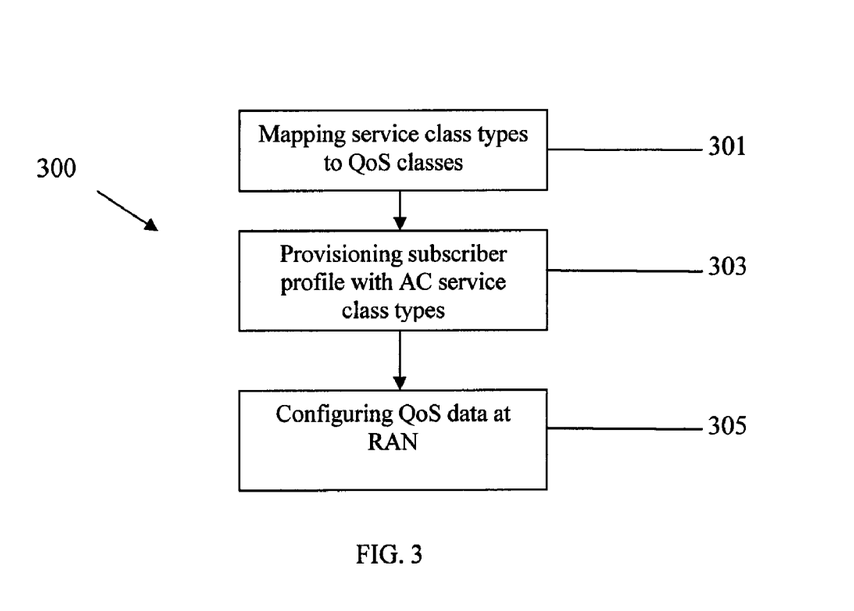
FIG. 3 illustrates an embodiment of an intra-user QoS enhancement process.
Figure 4:
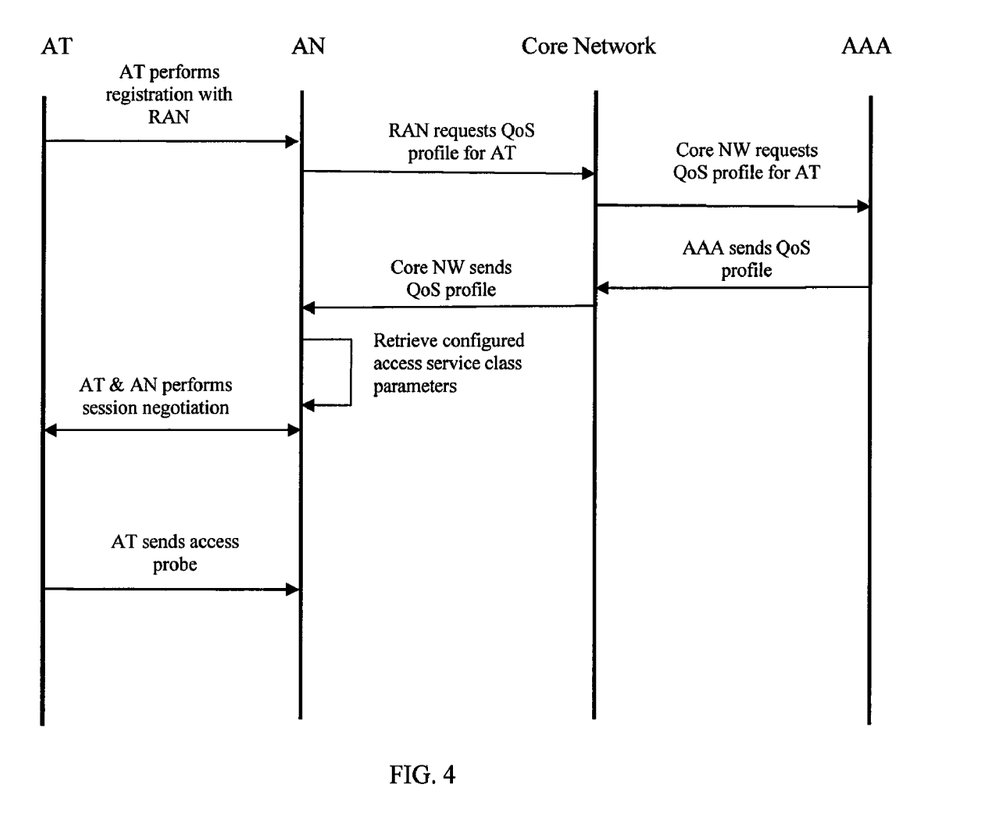
FIG. 4 illustrates an embodiment of a message flow diagram for the intra-user QoS enhancements.
Figure 5:
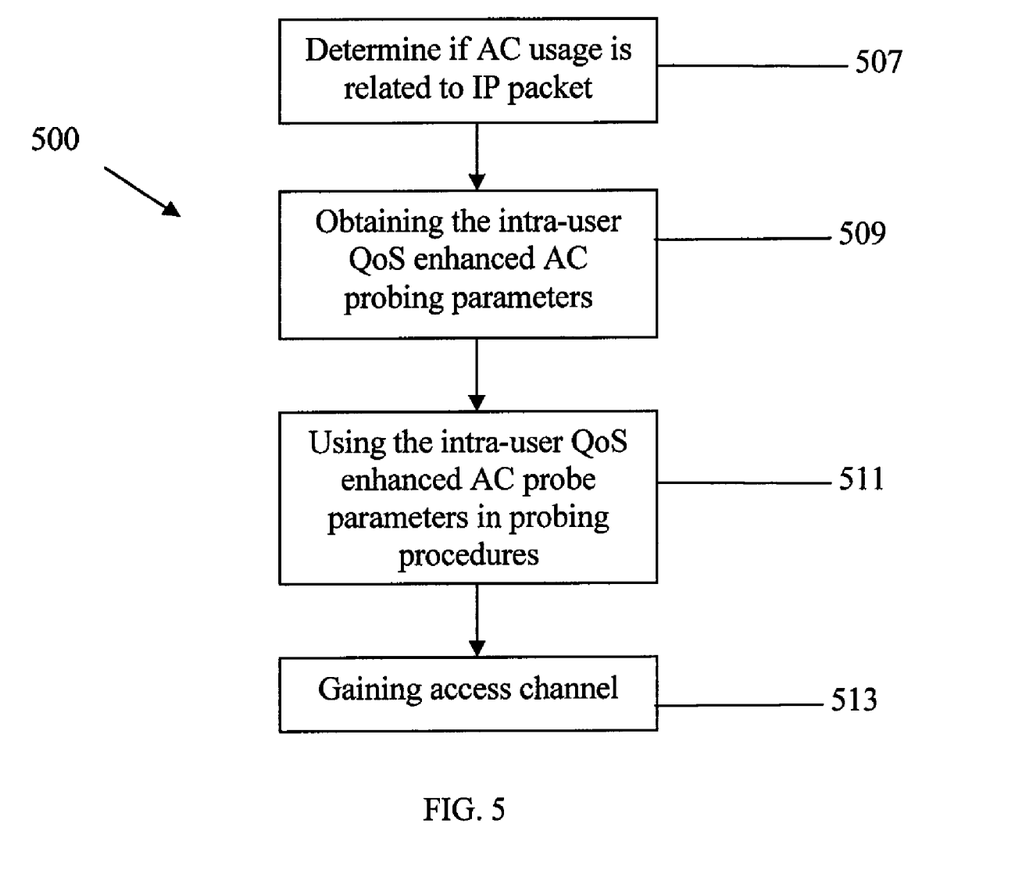
FIG. 5 illustrates an embodiment of the intra-user QoS enhancement process.

The process part of the intra-user QoS enhancements may comprise provisioning the QoS data structures and subscriber profile, downloading the profile into the AN 131 and the AT 111, and using intra-user QoS enhancements in the AC probe procedures. FIG. 3 illustrates the process of provisioning the intra-user QoS profile. FIG. 4 illustrates the process of downloading the profile into the AN 131 and the AT 111. FIG. 5 illustrates the process of using the intra-user QoS enhancements in the AC probe procedures.

FIG. 3 illustrates an embodiment of an intra-user QoS process 300 for provisioning intra-QoS data. The process 300 may comprise mapping the intra-user service classes at 301, provisioning subscriber profiles with the intra-QoS data at 303, and configuring the QoS data into a RAN 305. Each of these blocks is described in further detail below.

The block 301 shows mapping the intra-user service classes to established QoS types. To be compliant with the IP protocol and other related protocols, the intra-user service classes may be mapped to the existing infrastructure such as the widely used IP differentiated service (DiffServ) QoS classes, integrated services (IntServ) QoS classes, or multi-protocol label switching (MPLS) QoS classes. For example, in one embodiment, the AT may be required by the protocol in use to identify the DiffServ service class in order to set the type of service (TOS) field in the IP header. Mapping the intra-user service classes to the Diffserv classes may meet the protocol operation requirement. The mapping may be performed at the system design time or the subscriber profile provisioning time, depending on the system design choice.

The block 303 shows provisioning a subscriber profile with the QoS related data including the intra-user service class information. When the AT is provisioned, the user's inter-user service class may be provisioned into the subscriber profile. For example, if the subscriber belongs to the gold class, then the class related information such as allowed services may be provisioned into the subscriber profile. The intra-user service class information and associated mapping to Diffserv classes may be provisioned into the subscriber profile or built into the AN when the system is constructed, depending on the system design choice. This step may take place before the service activation, e.g., when the user powers on the AT.

The block 305 shows configuring QoS data into a RAN. The definitions of the inter-user service classes and the intra-user service classes, and the corresponding probe scaling factors and the probe scaling factor parameters may be configured into the RAN before the service activation time. Thus, the AN in the RAN may collaborate with an AT to achieve the intra-user QoS enhancements at the time the AC is requested.

FIG. 4 illustrates an embodiment of a message flow diagram 400 for downloading a subscriber profile with the intra-user QoS data at the time of the AT activation. The flow diagram comprises a message from an AT to the AN for a registration of a user, a message from the AN to a core network node for the user registration, a message from the core network node to an AAA server, a return message from the AAA server to the core network node with a subscriber profile, a return message from the core network node to the AN, a message exchange between the AT and the AN for session setup, and a message from the AT to the AN for AC request using the data in the subscriber profile. Each of these messages is described in further detail below.

The message from the AT to the AN is for the user registration. Upon activation of the AT, e.g. powering on, the AT sends a registration message to the AN to have the AT authenticated and to retrieve its subscriber profile.

The message from the AN to the core network node for the subscriber registration passes the registration request from the AN to the core network. The message from the core network to the AAA server passes the registration request to the AAA server. Upon receiving the registration request, the AAA server may authenticate the user by confirming the identity or credential the user included in the registration request is authentic. The AAA server may then retrieve the associated subscriber profile that may specify a service class this user belongs to and the type of services grantable to the user, along with the applicable restrictions. The AAA server may also create an accounting record for the user to keep track of the usage of the services and resources by the user. Examples of the information that may be included in the subscriber profile include the maximum authorized aggregate bandwidth for best-effort traffic, the authorized flow profile IDs for each direction, the maximum per flow priority, the allowed differentiated services markings, the service option profile, and the inter-user priority for best effort traffic, among others.

The return message from the AAA server to the core network is to send back the retrieved subscriber profile. The return message from the core network to the AN passes along the retrieved subscriber profile to the AN. Upon receiving the retrieved subscriber profile, the AN may retrieve a set of intra-user service classes for a service class to which this user belongs. For example, if the user is of the gold class, a set of intra-user service classes of the gold class are retrieved. The AN may compare the retrieved intra-user service class parameters to a local configuration to determine whether the intra-user service class parameters are compatible with the AN. If the intra-user service class parameters are not compatible with the AN, the AN may modify the intra-user service class parameters so that they become compatible with the AN. Alternatively, the AN may create the intra-user service class if an intra-user service classes for a service class to which this user belongs does not exist. Then the AN starts a set of message exchanges with the AT for a session negotiation. The session negotiation allows the two parties, the AT and the AN, to agree on a set of service parameters such as the codec to be used, bandwidth to be supported, and others. As part of the session negotiation, the AN may negotiate at least one AC probing parameter, such as APersistenceOverride, during the session negotiation. The AN may also send the retrieved intra-user service class related parameters to the AT. At the time a session is established, the AN may classify a link flow to a particular intra-user service class. For example, a link flow established for a PTT call may be categorized as belonging to the EF intra-user service class, and a link flow for a web browser session may be as belonging to the BE intra-user service class.

Upon the completion of the session negotiation, the AT may have a set of access intra-user service classes and the associated intra-user QoS enhanced AC probing parameters specific to its profile. Then as a need arises to gain access to the AC, the AT uses the intra-user QoS enhanced AC probing parameters in the AC probe procedures to achieve intra-user QoS enhancements.

FIG. 5 illustrates an embodiment of an intra-user QoS process 500. The process 500 may comprise determining if an AC access is related to IP packets at 507, obtaining the intra-user QoS enhanced AC probing parameters at 509, using the intra-user QoS enhanced AC probing parameters in the AC probe procedures at 511, and gaining access to the AC at 513. Each of these blocks is described in further detail below.

The process 500 may begin by determining the type of an AC access at 507. As a need arises to gain access to the AC, the AT makes a decision on the type of AC access. In one embodiment, a distinction is made between two types of AC accesses: one that involves sending IP packets, and another that does not involve sending IP packets. An example of the first type is to send packets for a user-initiated link flow such as a PTT call or a web browsing session. Because sending IP packets is involved, the intra-user QoS enhancements are applicable. An example of the second type may be to send a signaling message over the AC in response to a signaling message from the AN.

The process 500 may continue by obtaining the intra-user service class parameters for AC probe procedures at 509. According to one embodiment, the AT may obtain a proper set of the intra-user QoS enhanced probing parameters, according to the intra-user service class of the link flow for which the AC is being requested. For example, if it is a web browsing session, then a set of intra-user QoS AC probing parameters for the lower-priority BE intra-user service class may be obtained. For a PTT call, a set of intra-user QoS AC probing parameters of the higher-priority EF intra-user service class may be obtained.

The process 500 may continue by using the obtained set of intra-user QoS AC probing parameters in the AC probe procedures at 511. The intra-user QoS AC probing parameters may be applied in the ensuing AC probe procedures that may include persistence test, probe backoff, probe sequence backoff, and combination ruling. Subsequent thereto, the AT may succeed in gaining access to the AC at 513.

The present disclosure may be implemented in a variety of ways other than the described configurations. Alternatively, the functions embodied in the intra-QoS module 205, and the steps illustrated in the intra-user QoS process 300 and 500, may be combined into fewer or more components or steps, as a matter of design choice.

Figure 6:
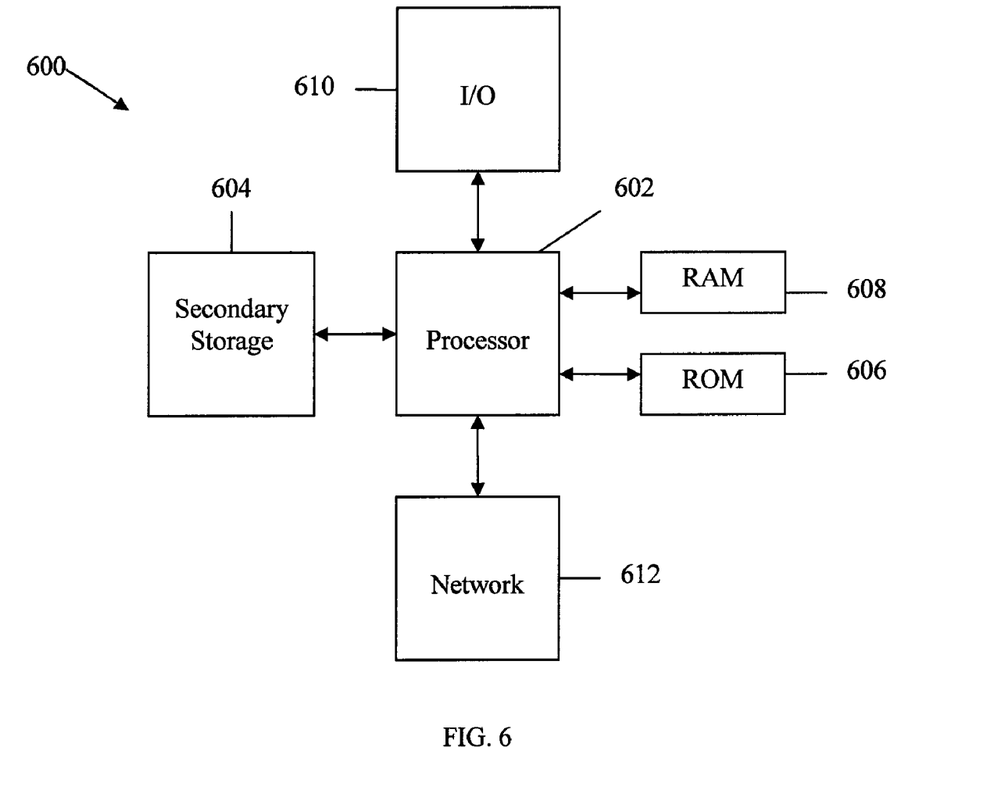
FIG. 6 illustrates an exemplary general-purpose computer system suitable for implementing the several embodiments of the disclosure.

The network components described above may be implemented on any general-purpose network component, such as a computer, network, or node, with sufficient processing power, memory resources, and network throughput capability to handle the necessary workload placed upon it. FIG. 6 illustrates a typical, general-purpose network component suitable for implementing one or more embodiments of a node disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) 610 devices, and network connectivity devices 612. The processor may be implemented as one or more CPU chips.

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage. The RAM 608 is used to store volatile data and perhaps to store instructions. Access to both ROM 606 and RAM 608 is typically faster than to secondary storage 604.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   requesting registration from an access node (AN);
   receiving a plurality of intra-user service classes from the AN based on the requesting, where the plurality of intra-user service classes are based on an inter-user quality of service (QoS) class;
   modifying a plurality of access channel (AC) probe parameters using the plurality of intra-user service classes, wherein the AC probe parameters are modified with at least one of a plurality of AC probe scaling factors, the plurality of AC probe scaling factors comprising a persistence test scaling factor, a probe backoff scaling factor, and a probe sequence backoff scaling factor; and
   accessing an AC using the modified AC probe parameters.

2. The method of claim 1, wherein the method is carried out on a third generation (3G), or a fourth generation (4G) wireless access terminal.

3. The method of claim 1, wherein the intra-user service classes comprise:
   expedited forwarding (EF), assured forwarding (AF), and best effort (BE) in order of priority, and wherein the intra-user service classes further comprise other signaling (OS) and other experimental (OE); multi-protocol label switching (MPLS) classes; or integrated service (IntServ) classes.

4. The method of claim 1, wherein the persistence test scaling factor, the probe backoff scaling factor, and the probe sequence backoff scaling factor modify existing AC probe parameters, thereby supporting intra-user QoS on the AC.

5. The method of claim 1, wherein the AC probe parameters are further modified with at least one combination ruling factor that resolves ambiguities between the intra-user service classes when a plurality of link flows having different intra-user service classes are requested in a single AC probe.

6. The method of claim 5, wherein the combination ruling factor comprises CR-EF, CR-AF, CR-BE, CR-OS, and CR-OE.

7. The method of claim 1, further comprising mapping the intra-user service classes to a plurality of Internet Protocol (IP) differentiated service (DiffServ) classes, integrated service (IntServ) classes, or multi-protocol label switching (MPLS) classes.

8. A communications component comprising: a processor configured to implement a method comprising:
   recognizing a registration request from an access terminal (AT), wherein the registration request causes a quality of service (QoS) profile comprising an inter-user QoS class for the AT to be requested;
   retrieving at least one intra-user access service parameter based on the inter-user class; and
   sending the intra-user access service parameter to the AT, receiving probes from the AT via an access channel (AC), the probes being based on at least one AC probing parameter, the at least one AC probing parameter being modified according to the at least one intra-user access service parameter, and wherein the at least one AC probing parameter is modified with at least one of a plurality of AC probe scaling factors, the plurality of AC probe scaling factors comprising a persistence test scaling factor, a probe backoff scaling factor, and a probe sequence backoff scaling factor.

9. The component of claim 8, wherein the method further comprises negotiating the at least one access channel (AC) probing parameter with the AT during a session negotiation/configuration.

10. The component of claim 8, wherein the method further comprises negotiating the at least one access channel (AC) probing parameter with the AT during an active session.

11. The component of claim 8, wherein the method further comprises creating the intra-user access service parameter if the intra-user access service parameter is not already available.

12. The component of claim 8, wherein the method further comprises comparing the intra-user access service parameter to a local configuration setting to determine whether the intra-user access service parameter is compatible with a local access node (AN).

13. The component of claim 12, wherein the method further comprises modifying the intra-user access service parameter to be compatible with the local AN if the intra-user access service parameter is not compatible with the local access node.

14. The component of claim 8, wherein the component is part of an access node (AN).

15. A mobile access network comprising:
   an access node (AN) in communication with a plurality of access terminals (ATs), wherein the AN differentiates service for the ATs based on inter-user service classes and intra-user service class types, wherein the AN is configured to
   receive a registration request from an AT,
   retrieve an intra-user access service parameter based on an inter-user quality of service (QoS) class of the AT,
   send the intra-user access service parameter to the AT based on the registration request, and
   receive probes from the AT via an access channel (AC), the probes being based on the at least one AC probing parameter that is modified according to the intra-user access service parameter, and wherein the at least one AC probing parameter is modified with at least one of a plurality of AC probe scaling factors, the plurality of AC probe scaling factors comprising a persistence test scaling factor, a probe backoff scaling factor, and a probe sequence backoff scaling factor.

16. The network of claim 15 wherein the intra-user service class types are used to modify the at least one access channel (AC) probe parameter.

17. The network of claim 15 wherein the network further comprises at least one combination ruling factor that resolves ambiguities between the intra-user service class types when a plurality of link flows having different intra-user service class types are requested in a single access channel (AC) probe.

18. The network of claim 15,
wherein the ATs comprise a first AT having a first inter-user service class and a second AT having a second inter-user service class;
wherein the first AT has a first application having a first intra-user service class type and the second AT has a second application having a second intra-user service class type;
wherein the first inter-user service class is of a higher priority than the second inter-user service class; wherein the first intra-user service class type is of a lower priority than the second intra-user service class type; and
wherein the AN favors the second application over the first application.

19. A mobile access network, comprising:
a first network device configured with a first intra-user quality of service (QoS) module configured to vary an access latency for an access channel (AC) using a plurality of intra-user QoS enhanced AC probing parameters in a plurality of AC probe procedures, thereby gaining access to the AC, wherein the plurality of intra-user QoS enhanced AC probing parameters are based on a plurality of default AC probing parameters and a plurality of AC probe scaling factor parameters, and wherein the plurality of AC probe scaling factor parameters are based on a plurality of intra-user service classes and a plurality of AC probe scaling factors.

20. The mobile access network of claim 19, further comprising a second network device configured with a second intra QoS module configured to, collaborate with the first intra-user QoS module in the AC probe procedures.

21. The mobile access network of claim 20, wherein the first network device comprises a wireless terminal device and the second network device comprises a wireless access node.

22. The mobile access network of claim 19, wherein the AC probe procedures comprise a persistence test, a probe backoff, a probe sequence backoff, and a combination ruling.

* * * * *